(12) United States Patent
Rosthauser

(10) Patent No.: US 8,097,658 B2
(45) Date of Patent: Jan. 17, 2012

(54) PROCESS FOR THE PRODUCTION OF MEDIUM DENSITY DECORATIVE MOLDED FOAMS HAVING GOOD FIRE RETARDANT PROPERTIES WITH REDUCED MOLD TIMES, FIRE RETARDANT COMPOSITIONS AND FOAMS PRODUCED BY THIS PROCESS

(75) Inventor: James W. Rosthauser, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 12/620,827

(22) Filed: Nov. 18, 2009

(65) Prior Publication Data

US 2011/0118369 A1    May 19, 2011

(51) Int. Cl.
   *C08G 18/06* (2006.01)
(52) U.S. Cl. ........ 521/103; 521/107; 521/108; 521/123; 521/130; 521/170; 521/172; 521/173; 521/174
(58) Field of Classification Search ................ 521/103, 521/107, 108, 123, 130, 170, 172, 173, 174
See application file for complete search history.

(56) References Cited

U.S. PATENT DOCUMENTS

| | | | |
|---|---|---|---|
| 4,258,141 A * | 3/1981 | Jarre et al. ............... | 521/114 |
| 4,407,981 A | 10/1983 | Aaronson | |
| 4,467,056 A | 8/1984 | Staendeke et al. | |
| 4,690,954 A | 9/1987 | Wampfler et al. | |
| 4,748,195 A | 5/1988 | Hackl et al. | |
| 4,797,428 A | 1/1989 | Reichmann | |
| 4,895,878 A * | 1/1990 | Jourquin et al. ........ | 521/103 |
| 4,940,632 A | 7/1990 | Nicola et al. | |
| 5,086,084 A | 2/1992 | Michaelson | |
| 5,534,291 A | 7/1996 | Fukumura et al. | |
| 5,945,467 A | 8/1999 | Iwata et al. | |
| 5,962,541 A | 10/1999 | Peterson et al. | |
| 6,117,937 A * | 9/2000 | Matsumoto et al. ...... | 524/765 |
| 6,319,962 B1 | 11/2001 | Singh et al. | |
| 6,559,196 B2 * | 5/2003 | Narayan et al. .......... | 521/174 |
| 2006/0100295 A1 * | 5/2006 | Heraldo et al. ............. | 521/99 |
| 2009/0130350 A1 | 5/2009 | Lauer et al. | |

FOREIGN PATENT DOCUMENTS

EP    0512629 A2    11/1992

OTHER PUBLICATIONS

U.S. Appl. No. 12/231,153, filed Aug. 29, 2008 by James W. Rosthauser (assigned to Bayer MaterialScience LLC).
Castrovinci, A. et al, Ammonium Polyphosphate-aluminum Trihydroxide Antagonism in Fire Retarded Butadiene-styrene Block Copolymer, European Polymer journal (2005), 41(9). pp. 2023-2033.
Genovese, Antonietta et al, Structural and Thermal Interpretation of the Synergy and interactions between the Fire Retardants Magnesium Hydroxide and Zinc Borate, Polymer Degradation and Stability (2007), 92(1), pp. 2-13.
Shen, Kelvin K. et al, Recent Advances in the Use of Borates as Fire Retardants, RAFMFH (1995), vol. 5, pp. 239-247.

* cited by examiner

*Primary Examiner* — John Cooney
(74) *Attorney, Agent, or Firm* — Lyndanne M. Whalen; Noland J. Cheung

(57) ABSTRACT

Fire-resistant, medium density molded polyurethane foams which may be removed from a mold in substantially shorter times than previously possible are produced by the process of the present invention. These reduced de-mold times are achieved by including a solid flame retardant composition in the polyurethane foam forming composition. This solid flame retardant composition includes a melamine coated ammonium polyphosphate and zinc borate.

12 Claims, No Drawings

PROCESS FOR THE PRODUCTION OF MEDIUM DENSITY DECORATIVE MOLDED FOAMS HAVING GOOD FIRE RETARDANT PROPERTIES WITH REDUCED MOLD TIMES, FIRE RETARDANT COMPOSITIONS AND FOAMS PRODUCED BY THIS PROCESS

BACKGROUND OF THE INVENTION

This invention relates to a process for the production of medium density, fire retardant decorative molded foams in which the in-mold time is significantly reduced. The invention also relates to the fire retardant composition employed in this process and to foams produced by this process.

Polyurethane foams are used for a wide variety of applications, such as thermal insulation, packaging, upholstery, carpet underlay, automobile dashboards, building materials, and structural material. An important factor to be considered in employing polyurethane foams is the ability of such materials to resist ignition, or once ignited, to be self-extinguishing after the ignition source is removed. This factor becomes even more important if the polymeric material is to be used within a confined space or in outdoor applications in locations that are fire-prone. These polyurethane foams can even be used, for example, as roofing materials in fire-prone areas.

As those skilled in the art are aware, the most common method of decreasing the flammability of polyurethane foams is by incorporating a flame retarding agent, such as a halogen- or phosphorus-containing compound, into the foam formulation. Although such compounds provide some improvement in the flame retardation properties, relatively large quantities of these agents may have to be employed to obtain satisfactory results. In general, incorporating relatively high amounts of flame retardants into the polyurethane foam reduces the overall physical property levels of the polyurethane foam.

For many years, the dominant blowing agents used to expand polyurethane foam had been the cholofluorocarbons. These blowing agents were phased out after having been determined to pose a threat to stratospheric ozone. After the cholofluorocarbons were phased out, the most common class of blowing agents became the hydrogenated chlorofluorocarbons. Although these are considered to be somewhat more environmentally friendly expansion agents, the hydrogenated chlorofluorocarbons still contain some chlorine. The chlorine atoms of hydrogenated chlorofluorocarbons are stable at altitudes under the stratosphere, and thus have a lower ozone-depleting potential ("ODP"). However, because of the hydrogenated chlorofluorocarbons still have a small ODP, they have also been mandated for eventual phase out. Water and/or carbon dioxide are rapidly becoming the blowing agents of choice for polyurethane foam manufacturers.

As known to those skilled in the art, polyurethane foams can be made using trimethylolpropane-based polyols (See e.g., U.S. Pat. Nos. 6,319,962, 4,690,954 and 4,407,981). Although there are some polyurethane foams available that pass the ASTM E-84 Tunnel Test "Standard Test Method for Surface Burning Characteristics of Building Materials" (ASTM International) with a Class I rating (U.S. Pat. Nos. 4,797,428 and 4,940,632), these foams use the alternative chlorofluorocarbon/hydrogenated chlorofluorocarbon blowing agents in combination with highly loaded polyester polyol blends and liquid flame retardants or have high flame retardant filler loadings, including phosphorus-based materials, in combination with trimethylolpropane-based polyols to produce the desired end result. These polyester-containing foams tend to reduce long term hydrolytic and "creep" stability and thus become a problem for applications outside of insulation-type foams.

U.S. Pat. No. 5,086,084 describes a foamed polymeric material suitable as a wood substitute, made of a continuous phase of polyurethane having solid polyvinyl chloride particles dispersed therein. The wood-like material of this patent contains about 100 parts of a foamable urethane, and 10 to 50 parts polyvinyl chloride (PVC) particles having a particle size below 200 μm. This material has a microcellular structure with cells on the order of 0.1 mm in average diameter or less. The walls are said to be made of a matrix of polyurethane reinforced with PVC particles. There is, however, no mention of the heat performance properties of this wood substitute and de-mold times (i.e., time after which the molded article may be removed from the mold) of from five to ten minutes are disclosed.

Therefore, despite the abundance of disclosed processes to obtain flame retardant foams, polyurethane foam manufacturers remain interested in a foam that is solely water- or carbon dioxide-blown; that satisfies the burning brand test ASTM E-108 with a Class A rating. A flame retardant combination that minimizes the amount of halogen-containing compounds would also be highly desirable from an environmental perspective.

Thus, the development of such flame retardant polyurethane foam would be very desirable. Because of environmental concerns, it would be also be desirable for such a foam use non-chlorofluorocarbon/hydrogenated chlorofluorocarbon-containing blowing agents, such as water and/or carbon dioxide.

The paper titled "Ammonium Polyphosphate-Aluminum Trihydroxide Antagonism in Fire Retarded Butadiene-Styrene Block Copolymer" by A. Castrovinci et al in *European Polymer Journal*, (2005), 41(9), 2023-2033, discusses the effect of aluminum trihydroxide (ATH) on the surface protection from fire provided by ammonium polyphosphate (APP) to a styrene butadiene rubber (SBR). It was necessary to add a significantly higher amount of ATH than APP to achieve comparable results, i.e. 60 wt. % of ATH vs. 10-12 wt. % of APP. In addition, the substitution of 1 wt. % of ATH for APP in an SBR containing 12 wt. % of APP showed an antagonistic effect. This is explained by Castovinci et al by the interaction between SBR, APP and ATH in which aluminum phosphates form on heating APP in SBR, and these aluminum phosphates negatively affect the surface protection that the APP provides to the SBR.

The interaction between two fire retardants was studied in "Structural and Thermal Interpretation of the Synergy and Interactions Between the Fire Retardants Magnesium Hydroxide and Zinc Borate" by A. Genovese et al, *Polymer Degradation and Stability*, (2007), 92(1), 2-13. The fire performance of a polyolefin with a magnesium hydroxide fire retardant reduces the heat release rate through absorption of heat during conversion to magnesium oxide. Zinc borates which undergo dehydration with increasing temperatures also increased fire performance of a polyolefin. Various structural changes were seen in the zinc borates. Endothermic transitions occurred in zinc borates, and $2ZnO.3B_2O_3.3H_2O$ underwent an exothermic crystalline transition at a high temperature. In addition, magnesium orthoborate ($3MgO.B_2O_3$), a new crystalline phase, and some zinc oxide (ZnO), formed on reaction of magnesium oxide with zinc borate ($2ZnO.3B_2O_3.3H_2O$) at temperatures greater than 500° C. Thus, it appears that there is a synergy that results from the combination of magnesium hydroxide and zinc borates as flame retardants for polyolefins.

Flame resistant, thermoplastic polyurethane elastomers and processes for their preparation are disclosed in U.S. Pat. No. 4,748,195. The flame retardant package in these TPUs is (a) a compound selected from the group consisting of antimony trioxide, zinc borate and mixtures thereof, (b) a chlorinated polyethylene, and (c) a brominated aromatic compound selected from the group consisting of polytetrabromo-bis(phenol)-A-glycidyl ether, polytribromostyrene and polytetrabromo-bis(phenol)-A-carbonate. Polyurethane foams are not mentioned in this disclosure. This disclosure is also silent with respect to de-mold times required for producing molded polyurethane elastomers from the disclosed flame retardant package.

EP Application 0,512,629 discloses the usefulness of zinc borate in combination with encapsulated ammonium polyphosphate in thermoplastic urethanes. It also discloses that the solid elastomer compositions can achieve V0 rating in a UL94 vertical burn test. The flame retardant combination must contain, in addition to zinc borate and a "carbonific" (polyhdric char-forming) compound such as pentaerythritol, a large excess of ammonium polyphosphate comprising from 30 to 50% of the filled polyurethane. These materials have densities of 65 to 100 pcf making them less attractive as construction materials from a practical and economical perspective. This disclosure is silent with respect to de-mold times for articles produced with the disclosed flame retardant combination.

Zinc borates and their use as fire-retardants in halogen-containing and halogen-free polymers are described in "Recent Advances in the use of Borates as Fire Retardants" in the journal "Recent Advances Flame Retardant Polymeric Materials", (RAFMFH), 1995, Vol. 6, pp. 239-247. Advantages of zinc borates include its ability to act as a smoke suppressant, flame retardant, afterglow suppressant, char promoter, anti-arcing agent, and improves oil resistance, and inhibits plate out in polymers containing siloxanes.

U.S. application Ser. No. 12/231,153 (PO-9133) describes polyurethane foams made with improved flame retardant foam systems that are produced with water and/or carbon dioxide as the blowing agent, i.e., which are free of halogenated flame retardants. The flame retardant described in this application is a composition which includes both ammonium polyphosphate and zinc borate. Advantages of the foams described in this application include: (1) medium density (10-30 pounds per cubic foot (pcf)) making them suitable for construction materials; (2) flame resistance allowing them to be used in fire-prone areas; (3) flame retardants which do not include halogen-containing compounds; and (4) such low amounts of flame retardant that they are flexible enough for demanding applications.

The foams described in U.S. Ser. No. 12/231,153 have the disadvantage of a long cure time unless relatively large amounts of catalyst are included in the reaction mixture. This long cure time makes it necessary to allow the polyurethane-forming composition to remain in the mold for long periods of time thus reducing production capability.

U.S. Pat. No. 4,467,056 describes an ammonium polyphosphate flame retardant which is encased in a hardened water-insoluble polycondensation product of melamine and formaldehyde. This flame retardant is taught to be useful as a flame retardant in plastics, particularly, polyurethane foams. However, because the ammonium polyphosphate is encapsulated using an aqueous methanol solution of melamine and formaldehyde, removal of all water from the encapsulated ammonium polyphosphate can not be ensured. The presence of such residual water in a foam-forming mixture can be expected to affect the density of the product foam. Because the amount of residual water would be expected to vary, control of foam density made with ammonium polyphosphate encapsulated in this manner would be difficult. U.S. Pat. No. 4,467,056 does not, however, disclose anything with respect to adaptation of foam-forming systems in which the disclosed flame retardant is employed. This patent is also silent with respect to de-mold times for molded polyurethane foams.

U.S. Pat. No. 5,534,291 discloses a process for producing melamine-coated ammonium polyphosphate particles. This patent does not, however, teach that use of the disclosed melamine-coated ammonium polyphosphate would have any effect upon the rate of reaction of a system into which such a flame retardant component is incorporated.

U.S. Pat. No. 5,945,467 describes flame-retardant thermosetting resin compositions in which melamine-coated ammonium polyphosphate particles and/or water-insoluble ammonium polyphosphate particles is/are included in a thermosetting resin. This patent does not, however, teach or suggest that use of the melamine-coated ammonium polyphosphate particles would have any effect upon rate of reaction.

It would therefore be advantageous to develop a process for producing flame retardant medium density polyurethane foams without the use of any halogenated flame retardant or blowing agent or a large amount of catalyst in which the rate of cure is substantially reduced, thereby enabling the production of molded articles with significantly shorter de-mold times than current systems.

SUMMARY OF THE INVENTION

It is an object of the present invention to provide a process for the production of a fire-resistant, molded, medium density (i.e., 10 to 30 pcf) polyurethane foam with significantly shorter de-mold times than prior art systems.

It is another object of the present invention to provide a composition for the production of fire-resistant, molded, medium density polyurethane foams which do not include a halogenated fire retardant or halogenated blowing agent which increases the rate of cure with a reduced amount of catalyst.

These and other objects which will be apparent to those skilled in the art are accomplished by including a solid flame retardant composition that includes zinc borate and a melamine-coated ammonium polyphosphate in the polyurethane foam-forming reaction mixture.

DETAILED DESCRIPTION OF THE INVENTION

The present invention relates to an improved process for the production of fire-resistant, molded, medium density polyurethane foams without the use of a halogenated fire retardant or halogenated blowing agent and with a reduced amount of catalyst with faster de-mold times and to the foams produced by this process.

In the process of the present invention, the polyurethane foam-forming mixture employed includes:
a) from 50 to 90, and preferably more than 75 to 85, parts by weight of a polyurethane foam-forming reactive mixture,
b) from 10 to 50, and preferably 15 to less than 25, parts by weight of solid flame retardant composition which includes:
 (i) a melamine coated ammonium polyphosphate,
 (ii) zinc borate,
 and, optionally,
 (iii) one or more metal oxides or hydrates thereof, in which the weight ratio of melamine coated ammonium polyphosphate to zinc borate ranges from 3:1 to 1:3;
in which the zinc borate is included in the foam-forming mixture in an amount such that the polyurethane foam produced comprises at least 5% by weight, based on 100% by weight of the foam, of zinc borate.

In the process of the present invention for preparing fire-resistant, molded, medium density polyurethane foams with shorter cure times, the polyurethane foam-forming composition described above is poured into an open mold, the mold is closed, the polyurethane-forming composition is allowed to react, and the molded polyurethane foam is removed from the mold.

A key feature of the process of the present invention is the reduced amount of time needed to allow the polyurethane-forming mixture to react before the molded article can be removed from the mold. It has been found that the present invention reduces the amount of time required in the mold by from 25 to 60%.

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

Suitable polyurethane foam forming reactive mixtures useful in the practice of the present invention are water blown polyurethane foam forming reactive mixtures in which the amount of water present is sufficient to result in a medium density foam, i.e. a density of about 10 to about 30 pcf. Typically, this is about 0.1 to about 1.0 (and preferably about 0.2 to about 0.7) parts by weight of water, based on 100 parts by weight of the polyurethane foam system. The amount of water is the total amount in the polyurethane foam-forming reactive mixture and includes water that is often adsorbed onto the hygroscopic surfaces of the flame retardant solids.

Suitable polyurethane foam-forming reactive mixtures suitable for use in the practice of the present invention include those known in the art. Such mixtures typically include (1) an isocyanate component which may include one or more of a polymethylene poly(phenyl isocyanate), an isocyanate group containing prepolymer based on a polymethylene poly(phenyl isocyanate), or a mixture thereof, and (2) one or more isocyanate-reactive components.

In the present invention, the isocyanate component (1) comprises a polymethylene poly(phenyl isocyanate), an isocyanate group containing prepolymer based on a polymethylene poly(phenyl isocyanate), or any mixture thereof, having an NCO group content of 25 to 33% by weight. It is more preferred that these polyisocyanates be compositions having a functionality of from about 2.1 to about 3.8, and an NCO group content of about 25% to about 33%, and a viscosity of less than about 1000 mPa·s at 25° C.

The polyisocyanate(s) will typically have an NCO functionality of at least 2.1, preferably at least 2.3 and more preferably at least 2.5. These polyisocyanates also typically have an NCO functionality less than or equal to 3.8, preferably less than or equal to 3.5 and more preferably less than or equal to 3.2. The polyisocyanate(s) used in the practice of the present invention may have an NCO functionality ranging between any combination of these upper and lower values, inclusive, e.g. from 2.1 to 3.8 preferably from 2.3 to 3.5 and more preferably from 2.5 to 3.2.

The polyisocyanate(s) employed in the practice of the present invention typically have an NCO group content of at least 25% by weight, preferably at least 27.5% by weight and most preferably at least 29% by weight. These polyisocyanates also typically have an NCO group content of less than or equal to 33% by weight, preferably less than or equal to 32% by weight and more preferably less than or equal to 31% by weight. Suitable polyisocyanates may have an NCO group content ranging between any combination of these upper and lower values, inclusive, e.g., from 25% to 33% by weight, preferably from 27.5% to 32% by weight, and more preferably from 29% to 31% by weight.

It is most preferred that the polyisocyanate(s) have an NCO group content of from 27.5% to 32% and a functionality of from 2.3 to 3.5. Suitable polyisocyanates satisfying these NCO group content and functionality criteria include: polymethylene poly(phenyl isocyanates) and prepolymers thereof having the required NCO group content and functionality.

Polymeric MDI as used herein, refers to polymethylene poly(phenyl isocyanate) which in addition to monomeric diisocyanate (i.e., two-ring compounds) also contains three-ring and higher ring containing products.

A particularly preferred polyisocyanate is a polymethylene poly(phenylisocyanate) having an NCO content of about 31.5%, a functionality of about 2.8, a viscosity of about 200 mPa·s at 25° C.

Prepolymers suitable for use in the practice of the present invention include those prepolymers prepared by reacting an excess of a polymethylene poly(phenyl isocyanate) with an isocyanate-reactive component to form an NCO terminated prepolymer. Such isocyanate-terminated prepolymers are disclosed in U.S. Pat. No. 5,962,541, the disclosure of which is hereby incorporated by reference. In the practice of the present invention, the polymeric diphenylmethane diisocyanate is reacted with a polyol, preferably a polyester polyol or a polyol blend having a functionality of from about 1.8 to about 4, and a number average molecular weight (as determined by end-group analysis) of from about 400 to about 2000. These prepolymers should have functionalities and NCO group contents within the ranges set forth above.

Suitable polyols for preparing such isocyanate-terminated prepolymers typically have a functionality of at least about 1.8, and more preferably at least about 1.9. These polyols also typically have functionalities of less than or equal to about 4, more preferably less than or equal to about 2.4, and more preferably less than or equal to about 2.2. In addition, the polyol may have a functionality ranging between any combination of these upper and lower values, inclusive, e.g. from 1.8 to 4, preferably from 1.8 to 2.4, and more preferably from 1.9 to 2.2.

The polyols used to prepare isocyanate-terminated prepolymers suitable for use in the practice of the present invention also typically have a number average molecular weight of at least about 400, and more preferably at least about 450. These polyols also typically have a number average molecular weight of less than or equal to 2000, preferably less than or equal to 800 and most preferably less than or equal to 500. These polyols may also have number average molecular weights ranging between any combination of these upper and lower values, inclusive, e.g. from 400 to 2000, preferably from 400 to 800, and more preferably from 450 to 500.

A particularly preferred polyisocyanate prepolymer comprises a reaction product of polymethylene poly(phenylisocyanate) and a 450 number average molecular weight polyester having an NCO content of about 30.5%, a functionality of about 2.8, and a viscosity of about 350 mPa·s at 25° C.

Isocyanate-reactive components useful for the production of polyurethane foams in accordance with the present invention include: one or more higher molecular weight components and one or more lower molecular weight components. Examples of suitable isocyanate-reactive components that have higher molecular weights include compounds such as polyether polyols, polyester polyols, polycarbonate diols, polyhydric polythioethers, polyacetals, aliphatic thiols, solids containing polyols including graft polyols, polyisocyanate polyaddition polyols, polymer polyols, PHD polyols and mixtures thereof, etc. Lower molecular weight compounds include lower molecular weight polyether polyols and other diols and triols, which may also be referred to as chain extenders and/or crosslinkers.

Preferred polyols for inclusion in the isocyanate-reactive component(s) used in the practice of the present invention include polyol blends or mixtures of polyesters containing at least two hydroxyl groups, as a rule having a molecular weight of from 300 to 10,000, in particular polyesters containing from 2 to 8 hydroxyl groups, preferably those having a molecular weight of from 350 to 3000, more preferably from 350 to 2000. These polyesters are generally used in amounts greater than 30%, preferably greater than 45%, most preferably greater than 55% of the polyol portion of the polyurethane foams.

Examples of these polyesters containing hydroxyl groups include reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. Ortho-phthalic acids, isophthalic acids and/or terephthalic acids may be used as the phthalic acid. Other suitable polybasic-carboxylic acids include aliphatic, cycloaliphatic, aromatic and/or heterocyclic and may be substituted, for example, with halogen atoms and/or may be unsaturated. Examples of suitable acids include: succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fatty acids, such as oleic acid, optionally mixed with monomeric fatty acids. Suitable polyhydric alcohols include: ethylene glycol, propylene glycol-(1,2) and -(1,3), diol-(1,8), neopentyl glycol, cyclohexane dimethanol (1,4-bis-hydroxymethylcyclohexane), 2-methyl-1,3-propane diol, glycerol, trimethylolpropane, hexanetriol-(1,2,6) butane triol-(1, 2,4), trimethylolethane, pentaerythritol, quinitol, mannitol and sorbitol, methylglycoside, also diethylene glycol, triethylene glycol, tetrathylene glycol, polyethylene glycols, dibutylene glycol, and polybutylene glycols. The polyesters may also contain carboxyl end groups. Polyesters of lactones, such as ε-caprolactone, or hydroxycarboxylic acids, such as δ-hydroxycaproic acid, may also be used.

Preferred polyester polyols for the use in the practice of the present invention are the polyesters of lactones or the reaction products of i) adipic acid and ii) low molecular weight aliphatic diol compounds. Molecular weights of these preferred polyesters are from 500 to 3000, preferably from 1000 to 2000. Particularly preferred polyester polyols for use in the practice of the present invention include the reaction products of (i) phthalic acid compounds and (ii) low molecular weight aliphatic diol compounds. Number average molecular weights of these particularly preferred polyesters are from 350 to 700, preferably 350 to 600. Such polyester polyols are described in U.S. Pat. Nos. 4,644,047 and 4,644,048, the disclosures of which are hereby incorporated by reference.

In accordance with the present invention, polyethers containing at least one, generally from 2 to 8, preferably 3 to 6, hydroxyl groups and having a number average molecular weight of from 100 to 10,000 of known type may be used in the polyol blend. These are prepared, for example, by the polymerization of epoxides, such as ethylene oxide, propylene oxide, butylene oxide, tetrahydrofuran, styrene oxide, or epichlorohydrin, either alone in the presence of for example $BF_3$, or by chemical addition of these epoxides, optionally as mixtures or successively, to starting components having reactive hydrogen atoms, such as alcohols or amines, water, ethylene glycol, propylene glycol-(1,3) or -(1,2), trimethylol propane, 4,4-dihydroxy diphenylpropane aniline, ammonia ethanolamine or ethylene diamine. Sucrose polyethers which have been described, for example in German Auslgeschrift Nos. 1,176,358 and 1,064,938 may also be used and are preferred. It is particularly preferred to use polyethers with OH numbers above 200.

Typically, these polyether polyols have an OH functionality of at least 2, and preferably at least 3. These polyether polyols also typically have an OH functionality of less than or equal to 8.0, and preferably less than or equal to 6.0. The polyether polyols of the invention may have an OH functionality ranging between any combination of these upper and lower values, inclusive, e.g. from 2.0 to 8.0, and preferably from 3.0 to 6.0.

The polyether polyols useful in the practice of the present invention typically have an OH number of at least 250, preferably at least 300 and most preferably at least 350. These polyether polyols also typically have an OH number of less than or equal to 750, preferably less than or equal to 650 and more preferably less than or equal to 550. The polyether polyols may have an OH number ranging between any combination of these upper and lower values, inclusive, e.g., from 250 to 750, preferably from 300 to 650, and more preferably from 350 to 550.

Although less preferred, it is possible to include polyethers with OH numbers between 14 and 56 to increase flexibility and impact resistance of the resulting foams. On those occasions when this is necessary, the amount of high molecular weight polyether(s) added should be less than 35%, preferably less than 25%, and most preferably less than 15%, by weight of the polyol portion of the polyurethane foams.

Polythioethers which may also be included in the polyol component used in the practice of the present invention are the condensation products obtained from thiodiglycol alone and/or with other glycols, dicarboxylic acids, formaldehyde, aminocarboxylic acids or aminoalcohols. The products obtained are polythio mixed ethers, polythio ether esters or polythio ether ester amides, depending on the co-components.

Polyhydroxyl compounds already containing urethane or urea groups and modified or unmodified natural polyols, such as castor oil, carbohydrates or starch may also be used in the practice of the present invention. Addition products of alkylene oxides and phenyl/formaldehyde resins or of alkylene oxides and urea/formaldehyde resins are also suitable according to the present invention.

Representatives of these compounds which may be used in the practice of the present invention have been described, for example, in High Polymers, Volume XVI, "Polyurethanes, Chemistry and Technology", by Saunders and Frisch, Interscience Publishers, New York; London, Volume I, 1962, pages 32-42 and pages 44 to 54 and Volume II, 1964, pages 5 and 6 and 198-199, and in Kunststoff-Handbuch, Volume VII, Vieweg-Hochtlen, Carl-Hanser-Verlag, Munich, 1966, for example, on pages 45 to 71.

Suitable for use in the lower molecular weight component of the isocyanate-reactive component are chain extenders and crosslinkers. These low molecular weight components typically have hydroxyl functionalities ranging from 1.5 to 4.0, molecular weights ranging from 62 to 450 and OH numbers ranging from 250 to 1900.

Such low molecular weight components typically have hydroxyl functionalities of at least 1.5 and preferably at least 2.0. These low molecular weight components also typically have a hydroxyl functionality of less than or equal to 4.0, and preferably less than or equal to 3.0. The polyether polyols of the invention may have an OH functionality ranging between any combination of these upper and lower values, inclusive, e.g. from 1.5 to 4.0, and preferably from 2.0 to 3.0.

The low molecular weight components typically have molecular weights of at least 62 and preferably at least 100. These components also typically have number average molecular weights of less than or equal to 450, and preferably less than or equal to 300. The chain extenders and/or crosslinkers which may be used in the practice of the present invention may have a molecular weight ranging between any combination of these upper and lower values, inclusive, e.g. from 62 to 450, and preferably from 100 to 300.

These low molecular weight components typically have hydroxyl numbers of at least 250 and preferably at least 350. These components also typically have hydroxyl numbers of less than or equal to 1900, and preferably less than or equal to 1100. The chain extenders and/or crosslinkers useful in the practice of the present invention may have hydroxyl numbers ranging between any combination of these upper and lower values, inclusive, e.g. from 250 to 1900, and preferably from 350 to 1100.

Some examples of suitable chain extenders include: ethylene glycol; 1,2- and 1,3-propanediol; 1,3-, 1,4- and 2,3-butanediol; 1,6-hexanediol; 1,8-octanediol; 1,10-decanediol; neopentyl glycol; 1,3- and 1,4-bis(hydroxymethyl)cyclohexane; 2-methyl-1,3-propanediol; diethylene glycol; triethylene glycol; tetraethylene glycol; polyethylene glycols; dipropylene glycol; tripropylene glycol; polypropylene glycols; dibutylene glycol; tributylene glycol; polybutylene glycols; N-methyl-diethanolamine; cyclohexane-dimethanol; 2-methyl-1,3-propanediol; and 2,2,4-trimethyl-pentane-1,3-diol. Other suitable chain extenders are amine-started polyethers such as the alkoxylation products of ethylenediamine, toluenediamine, monoethanolamine, diethanolamine, and triethanolamine, etc.

Also suitable are mixtures of the above chain extenders with higher functional compounds such as glycerol and/or trimethylolpropane, provided that the overall functionality of the mixture falls with the required range for chain extenders described herein. Any of the previously mentioned diols that are disclosed herein as being suitable for preparing polyesters are also suitable as chain extenders. Preferred chain extenders are diethylene glycol and mixtures of dipropylene with tripropylene glycol.

Suitable crosslinking agents useful in the practice of the present invention include compounds such as trimethylolpropane, pentaerythritol, glycerine and the lower molecular weight polyethers formed from glycerine and propylene oxide, which are preferred.

One isocyanate-reactive component suitable for use in a polyurethane foam-forming reactive mixture in the practice of the present invention includes:
(a) 30 to 70 parts by weight of at least one polyester polyol having a functionality of from 1.5 to 3.0 and an OH number of from 25 to 250, and which comprises the reaction product of
   (i) one or more aliphatic dicarboxylic acids,
   with
   (ii) one or more diols or triols;
(b) 20 to 40 parts by weight of at least one highly branched polyether polyol having a functionality of 3.0 to 8.0 and an OH number of 250 to 750 (and is preferably prepared by alkoxylating sucrose or a mixture of sucrose and one or more other suitable starter compounds); and
(c) 10 to 30 parts by weight of at least one chain extender having a hydroxyl functionality of from 2.0 to 2.9 and an OH number of from 400 to 1900,
with the sum of the parts by weight of (a), (b) and (c) totaling 100 parts by weight of the isocyanate-reactive component.

When using this particular isocyanate-reactive component to form a water blown polyurethane composition in the practice of the present invention, it is preferably reacted with 80 to 160 parts by weight of polymethylene poly(phenyl isocyanate), an isocyanate group containing prepolymer based on a polymethylene poly(phenyl isocyanate), or mixtures thereof having an NCO group content of from 25 to 33% by weight; water in a sufficient amount to result in a medium density (i.e. 10 to 30 pcf) polyurethane foam; and the solid flame retardant composition described herein.

A preferred isocyanate-reactive component to be used in accordance with the present invention comprises
(a) from 30 to 70 (preferably 45 to 65) parts by weight of at least one polyester polyol having a functionality of 2.0 to 3.0 and an OH number of 160 to 320, and that is the reaction product of one or more polyhydric alcohols with one or more phthalic acids or other polybasic (preferably dibasic) carboxylic acids, corresponding acid anhydrides or corresponding acid esters;
(b) 0 to 35 (preferably 0 to 25) parts by weight of a polyether polyol having a functionality of from about 1.5 to about 3 and an OH number of from about 14 to about 56;
(c) 0 to 30 parts by weight of at least one highly branched polyether polyol having a functionality of 3.0 to 8.0 and an OH number of 250 to 750 (and is preferably prepared by alkoxylating sucrose or a mixture of sucrose and one or more other suitable starter compounds); and
(d) from 0 to 30 (preferably 10 to 25) parts by weight of one or more chain extenders and/or one or more crosslinking agents,
with the sum of the parts by weight of (a), (b), (c) and (d) totaling 100 parts by weight of the isocyanate-reactive component.

In this preferred isocyanate-reactive component, the polyester polyol, component (a), preferably has a functionality of 2.0 to 3.0 and preferably has an OH number of 160 to 320. This polyester polyol component is preferably the reaction product of phthalic acid anhydride and diethylene glycol.

The preferred polyether polyols to be used as component (b) in this preferred isocyanate-reactive component, have a functionality of 1.8 to 3.5 and have an OH number of 14 to 56. These polyether polyols are preferably the reaction product of glycerine and a mixture of ethylene and propylene oxide.

The preferred polyether polyols to be used as component (c) in this preferred isocyanate-reactive component, have a functionality of 4 to 6 and have an OH number of 250 to 400. These polyether polyols are preferably the reaction product of a mixture of sucrose and water and/or propylene glycol and propylene oxide.

Preferred chain extenders and/or crosslinkers for component (d) of the above isocyanate-reactive component include diethylene glycol, tripropylene glycol, and gylcerine adducts with propylene oxide. These chain extenders and/or crosslinkers preferably have functionalities of 2.0 to 3.0 and OH numbers of 550 to 1100.

The solid flame retardant component includes: (i) a melamine coated ammonium polyphosphate, (ii) zinc borate, and optionally, (iii) one or more metal oxides or hydrates. The metal oxides or hydrates include, but are not limited to, alumina trihydrate, magnesium compounds such as, magnesium hydroxide, calcium hydroxide, and the various antimony oxides. Suitable antimony oxides are antimony pentaoxide and antimony trioxide.

In accordance with the present invention, the weight ratio of melamine coated ammonium polyphosphate to zinc borate ranges from 3.0:1.0 to 1.0:3.0, preferably 2.0:1.0 to 1.0:2.0. In addition, the zinc borate is present in an amount such that the resultant polyurethane foam contains at least 5%, preferably at least 6% by weight of zinc borate.

When the metal oxides and hydrates are optionally also present as part of the solid flame retardant component, the weight ratios of zinc borate to these metal oxides and hydrates thereof, range from 1.0:3.0 to 3.0:1.0. In addition, the zinc borate is present in an amount such that the resultant polyurethane foam contains at least 5%, preferably at least 6% by weight of zinc borate, with the amount of the melamine coated ammonium polyphosphate present as defined above.

In accordance with the present invention, the solid flame retardants are typically used herein in amounts of from 10% to less than 50%, preferably 15 to less than 25%, more preferably, about 20% by weight, based on 100% by weight of the flame retardant-containing polyurethane foam.

Ammonium polyphosphate is known and described as, for example, as a flame retardant. Ammonium polyphosphate (APP) is an inorganic salt of polyphosphoric acid and ammonia. The chemical formula of APP is $[NH_4PO_3]_n$, and corresponds to the general structure:

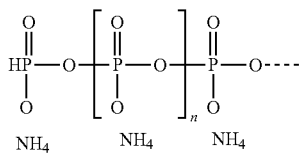

APP is a stable, non-volatile compound.

The Melamine-coated APP required for the practice of the present invention may be prepared by any of the techniques known to those skilled in the art. One such technique is disclosed in U.S. Pat. No. 5,945,467. Melamine-coated APP is commercially available from Clariant under the name Exolit AP-462, from JLS Chemicals under the designation APP-101, from Ferro-Plast under the name FerroFlam APP203, from Buddenheim under the names FR CROS C 30 and C40, and from Shifang Chengfang Chem. Co. Ltd. under the designation CF APP202.

Suitable zinc borates to be used as component (ii) of the solid flame retardant include those corresponding to the general chemical formulae: $2ZnO.3B_2O_3.5H_2O$; $2ZnO.3B_2O_3.3.5H_2O$; $2ZnO.3B_2O_3$; $4ZnO.B_2O_3.H_2O$, etc. Such zinc borates are commercially available from Rio Tinto Borax under the tradename Firebrake®. It is preferred that the flame retardant comprise zinc borate in a quantity such that the resultant polyurethane foam contains at least 5%, preferably from 6 to 15% by weight zinc borate.

In addition, the solid flame retardant component can optionally contain metal oxides, preferably alumina trihydrate.

In accordance with the present invention, the solid flame retardant contains (i) melamine coated ammonium polyphosphate and (ii) zinc borate in a weight ratio of from 3.0:1.0 to 1.0:3.0, preferably from 2.0:1.0 to 1.0:2.0. In addition, in this embodiment, the zinc borate is present in a sufficient quantity such that the resultant polyurethane foam contains at least 5% by weight of zinc borate.

When the solid flame retardant also includes (iii) one or more metal oxides or hydrates, this component is typically present
in an amount such that the weight ratio of zinc borate to metal oxide or hydrate ranges from 3.0:1.0 to 1.0:3.0, and preferably from 2.0:1.0 to 1.0:2.0. The resultant polyurethane foams will also contain at least 5%, and preferably at least 6%, by weight of zinc borate. The ammonium polyphosphate is present in a quantity as previously described.

Alumina trihydrate is a preferred compound to be used as component (iii) of the solid flame retardant component. When alumina trihydrate is present as part of the solid flame retardant, it is preferably present in an amount such that the weight ratio of zinc borate to alumina trihydrate ranges from 3.0:1.0 to 1.0:3.0, and more preferably from 2.0:1.0 to 1.0:2.0. As previously discussed, the polyurethane foams produced in accordance with the present invention contain at least 5%, preferably at least 6%, by weight of zinc borate. Also, the quantity of ammonium polyphosphate is as defined above.

In addition, the solid flame retardant may optionally contain other solid flame retardants such as various cyclic phosphate and phosphonate esters, and reactive oligomeric organophosphates having functionalities greater than 1 or urea.

In an optional embodiment, the present invention may additionally comprise liquid flame retardants. The liquid flame retardants useful in the practice of the present invention may or may not contain halogen atoms. Liquid flame retardants known to those skilled in the art can be and most often are used to reduce viscosity in systems that use solid flame retardants. Although they reduce viscosity of the polyol portion to ease handling and processing of the polyurethane, they do not improve but rather also decrease the impact resistance of the resulting polyurethanes.

The liquid flame retardant materials useful in the practice of the present invention are known in the art, and are commercially available. Useful liquid flame retardants include but are not limited to PHT-4 DIOL, available from Chemtura Corporation (or the equivalent Ethyl Corporation product RB-79), tris(chloropropyl) phosphate (Fyrol® PCF, available from Supresta Chemical), tris(chloroethyl) phosphate (Fyrol® CEF, available from Supresta Chemical), tris(1,3-dichloro-1-propyl) phosphate (Fyrol® 38, available from Supresta Chemical), tris(2,3-dichloro-1-propyl) phosphate. (Fyrol® FR-2, available from Supresta Chemical), triethyl phosphate (Fyrol® TEP available from Supresta Chemical), Antiblaze® 80, available from Albemarle, Antiblaze® 500, available from Albemarle, Ixol® B-251 and Ixol® 350, both available from Solvay-fluor, and dimethylmethyl phosphonate.

Other potential additives and auxiliary agents to be included in the polyurethane foam compositions used in the practice of the present invention include: catalysts, surface-active additives such as emulsifiers and foam stabilizers, as well as, known internal mold release agents, pigments, cell regulators, plasticizers, dyes, fillers and reinforcing agents such as glass in the form of fibers or flakes or carbon fibers. Polyvinyl chloride may also be incorporated as a filler.

Some examples of suitable catalysts, include tertiary amine catalysts and organometallic catalysts. Some examples of suitable organometallic catalysts include, for example organometallic compounds of tin, lead, iron, bismuth, mercury, etc. Also suitable are heat-activated amine salts as catalysts. These include both aliphatic and aromatic tertiary amines. It is preferred to use heat activated amine salts as catalysts. The amount of catalyst used in the practice of the present invention is that which is conventionally used in such systems, i.e., from about 0.05 to about 5% by weight. That reaction time is significantly reduced in the process of the present invention while the amount of catalyst included in the polyurethane foam-forming mixture is not increased is considered surprising and was unexpected.

Examples of emulsifiers and foam stabilizers include: N-stearyl-N',N'-bis-hydroxyethyl urea, oleyl polyoxyethylene amide, stearyl diethanol amide, isostearyl diethanolamide, polyoxyethylene glycol monoleate, a pentaerythritol/ adipic acid/-oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers also include polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

In accordance with the present invention, the various additives and auxiliary agents, as well as liquid flame retardants and/or polyvinyl chloride can be added to either the isocyanate-reactive component of the polyurethane foam forming reactive mixture, and/or, if these do not contain isocyanate-reactive groups, they can be added to the isocyanate-component of the polyurethane foam forming reactive mixture. Obviously, these additives, auxiliary agents, liquid flame retardants and/or polyvinyl chloride may also be added as separate components to the polyurethane foam forming reactive mixture.

The polyurethane foam compositions produced in accordance with the present invention may be molded using conventional processing techniques at isocyanate indexes ranging from about 90 to 150 (preferably from 100 to 130). The term "Isocyanate Index" (also commonly referred to as "NCO index"), is defined herein as the equivalents of isocyanate, divided by the total equivalents of isocyanate-reactive hydrogen containing materials, multiplied by 100.

In an open mold process, the reacting materials are poured into a mold (not injected into the mold). The materials suitable for processing in open molds are normally characterized by having a slightly longer gel time and curing time than those used in the closed mold (typical RIM) processes.

In the process of preparing molded polyurethane foams from these foam forming compositions, one typically introduces a polyurethane foam forming composition into an open mold, closes the mold, allows the composition to react, and removes the molded polyurethane foam from the mold. Suitable information in terms of relevant conditions, suitable molds, demold times, end uses, etc. are known by those skilled in the art. It is preferred that the free rise density of foam is between 8 and 20 pcf (pounds per cubic foot) and that the molded density of the foams is between 12 and 24 pcf.

It is also possible, but less preferred, to use a traditional RIM process or other closed mold process to prepare molded parts from the polyurethane foam forming compositions described herein.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Fahrenheit and all parts and percentages are parts by weight and percentages by weight, respectively.

EXAMPLES

The present invention is further illustrated, but is not to be limited, by the following examples. All quantities given in "parts" and "percents" are understood to be by weight, unless otherwise indicated.

The following components were used in the working examples:

| | |
|---|---|
| POLYOL A: | an aromatic polyester polyol (i.e. a polydiethylene glycol phthalate having a functionality of two and a hydroxyl number of about 190 (commercially available from Stepan Company of Northfield, IL as Stepanpol PS-1922A). |
| POLYOL B: | a glycerine-initiated polyether polyol having an OH number of about 36 mg KOH/g and a nominal functionality of about 3 (commercially available from Bayer MaterialScience as Hyperlite E-824). |
| POLYOL C: | diethylene glycol. |
| POLYOL D: | polypropylene glycol with a functionality of two and OH number of about 425 (commercially available from Bayer MaterialScience as Arcol Polyol PPG-425). |
| SURFACTANT: | a polyalkylene oxide methyl siloxane copolymer commercially available from Air Products and Chemicals of Allentown, PA as Dabco ® DC-198 |
| COMPATIBILIZER: | the reaction product of N,N-dimethylpropylene diamine with tall oil. |
| CATALYST A: | an acid blocked amine blowing catalyst, commercially available from Momentive Performance Materials of Albany, NY as Niax ® A-107. |
| CATALYST B: | an acid blocked amine gelling catalyst, commercially available from Momentive Performance Materials of Albany, NY as Niax ® A-577. |
| ISOCYANATE A: | a modified polymeric methylene (diphenyl diisocyanate) having an NCO group content of about 30.4% by weight (commercially available from Bayer MaterialScience as Mondur 1515). |
| FLAME RETARDANT A: | an equal weight mixture of alumina trihydrate, commercially available from Huber Engineered Materials of Atlanta, GA, as Hubercarb ® SB 122, zinc borate, commercially available from U.S. Borax, Inc. of Valencia, CA, as Firebreak ® ZB, and ammonium polyphosphate, commercially available from JLS Chemicals of Pomona, CA, as APP. |
| FLAME RETARDANT B: | an equal weight mixture of alumina trihydrate, commercially available from Huber Engineered Materials of Atlanta, GA, as Hubercarb ® SB 122, zinc borate, commercially available from U.S. Borax, Inc. of Valencia, CA, as Firebreak ® ZB, and melamine coated ammonium polyphosphate, commercially available from JLS Chemicals of Pomona, CA, as APP-101. |
| PIGMENT: | Brown iron oxide pigment, commercially available from Ricon Color Inc.. of West Chicago, IL as DPU-B2371-2B. |

A mixture of 55.68 parts POLYOL A, 20.87 parts POLYOL B, 19.26 parts POLYOL C, 0.23 parts water, 1.0 parts COMPATIBILIZER, 1.5 parts SURFACTANT, 3.29 parts POLYOL D, 0.10 parts CATALYST A, 1.3 parts CATALYST B, and 0.65 parts PIGMENT were stirred vigorously for 30 minutes. To the blend was added 55 parts of FLAME RETARDANT A or B and the mixtures were again agitated vigorously for another 15 minutes. To the blends containing flame retardants were added 102 parts isocyanate. Reactivity was determined using these cup shot methods, which are known to those skilled in the art: In the laboratory, the combined reactants both at 77° F. were stirred for 5 seconds under high shear and various reactive states were recorded. On a Krauss-Maffei reaction injection molding machine the components (polyol blend heated to 100° F. and isocyanate heated to 88° F.) were combined in an impingement mixhead with pressures of both streams at about 2000 psi. Again the same reactive states were recorded. Parts were considered to be cured when they could be removed from molds (heated to 140° F.) without deforming and/or without continuing to expand.

The properties of the foams thus produced are reported in the Table below.

TABLE

| Flame Retardant Mixture | FLAME RETARDANT A | FLAME RETARDANT B |
|---|---|---|
| Laboratory Test | | |
| Cream (seconds) | 30 | 23 |
| String Gel (seconds) | 60 | 40 |
| Tack Free (seconds) | 64 | 42 |
| End of Rise (seconds) | 75 | 48 |
| RIM Machine Test | | |
| Cream (seconds) | 20 | 12 |
| String Gel (seconds) | 41 | 23 |
| Tack Free (seconds) | 43 | 25 |
| End of Rise (seconds) | 60 | 30 |
| Cure time (minutes) | 5.5 | 3.0 |

As can be seen by comparing the cure time (amount of time prior to removing from 140° F. molds) of the melamine coated ammonium polyphosphate-containing composition to the non-coated ammonium polyphosphate-containing composition, a surprising 45% decrease in processing time was realized. This can amount to almost a doubling of production capacity by a simple change in one of the flame retardant components, a result that was surprising and of great utility.

Test shingles were evaluated by the UL 790 (Underwriters Laboratories Standard) test protocol also known as ASTM E108. Test decks were constructed using this protocol with shingles made from both of the rigid foam formulations. A layer of VersaShield (fire resistant roofing underlay sheeting available from Elk Building Products, a subsidiary of GAF Materials Corp., Wayne, N.J.) was applied directly to the plywood prior to attaching the shingles. A second layer (interplay) of VersaShield was applied on the section of shingle that would be covered by the next course of shingles for each layer. Both of the systems obtained Class A Burning Brand test ratings.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for the production of fire-resistant, molded, medium density polyurethane foam comprising:
    a) introducing into a mold a composition comprising:
        (1) 50 to 90 parts by weight of a polyurethane foam forming reactive mixture,
        (2) 10 to 50 parts by weight of solid flame retardant comprising
            (i) a melamine coated ammonium polyphosphate,
            (ii) zinc borate,
            and, optionally,
            (iii) one or more metal oxides or hydrates thereof,
            in amounts such that
                (A) the weight ratio of ammonium polyphosphate to zinc borate ranges from 3:1 to 1:3; and
                (B) the polyurethane foam produced comprises at least 5% by weight, based on 100% by weight of the foam, of zinc borate;
    b) allowing the composition introduced into the mold to cure to form the medium density polyurethane foam; and
    c) removing the medium density polyurethane foam from the mold
    in which less time elapses between steps b) and c) than when a solid flame retardant composition comprising ammonium polyphosphate which has not been coated with melamine and zinc borate is included the polyurethane foam forming reactive mixture (1).

2. The process of claim 1 in which from 15 to 30 parts by weight of the solid flame retardant composition are included in the composition introduced into the mold.

3. The process of claim 1 in which from 20 to 25 parts by weight of the solid flame retardant composition are included in the composition introduced into the mold.

4. The process of claim 1 in which the time elapsed between steps b) and c) is from 1.5 to 4.0 minutes.

5. The process of claim 1 in which a reduction in time between steps b) and c) of at least 25% is achieved when using melamine coated ammonium polyphosphate compared to using ammonium polyphosphate which has not been coated with melamine.

6. The process of claim 1 in which a reduction in time between steps b) and c) of at least 40% is achieved when using melamine coated ammonium polyphosphate compared to using ammonium polyphosphate which has not been coated with melamine.

7. The process of claim 1 in which the composition introduced into the mold comprises:
    (1) more than 75 to 85 parts by weight of a polyurethane foam forming reactive mixture, and
    (2) 15 to less than 25 parts by weight of solid flame retardant.

8. The process of claim 1 in which the polyurethane foam has a density of 10 to 30 pcf.

9. The process of claim 1 in which the solid flame retardant composition includes alumina trihydrate, which is present in a weight ratio of zinc borate to alumina trihydrate of 1:3 to 3:1.

10. The process of claim 1, in which the polyurethane foam forming reactive mixture comprises:
    (I) one or more polymethylene poly(phenyl isocyanate, an isocyanate group containing prepolymer based on a polymethylene poly(phenyl isocyanate) or a mixture thereof; and
    (II) one or more isocyanate-reactive components comprising:
        (a) at least one polyester polyol,
        (b) at least one highly branched polyether polyol, and
        (c) at least one chain extender.

11. The process of claim 1 in which the polyurethane foam forming reactive mixture comprises (I) one or more polymethylene poly(phenyl isocyanate, an isocyanate group containing prepolymer based on a polymethylene poly(phenyl isocyanate) or a mixture thereof; and
(II) one or more isocyanate-reactive components comprising:
(a) at least one polyester polyol,
(b) at least one polyether polyol having a functionality of about 1.8 to 3.5 and an OH number of from about 14 to 56,
(c) at least one highly branched polyether polyol having a functionality of about 4 to 6 and an OH number of about 250 to 400, and
(d) at least one chain extender.

12. A fire-resistant, molded, medium density polyurethane foam produced by the process of claim 1.

* * * * *